Patented Dec. 5, 1933

1,938,055

UNITED STATES PATENT OFFICE 1,938,055

ISATINE COMPOUND

Norbert Steiger, Frankfort-on-the-Main, and Walter Brunner, Frankfort - on - the - Main - Fechenheim, Germany, assignors to General Aniline Works, Inc., New York, N. Y., a corporation of Delaware No Drawing. Application January 6, 1933, Serial No. 650,580, and in Germany November 26, 1932

5 Claims. (Cl. 260—47)

This invention relates to isatine compounds, more particularly to those corresponding to the general formula

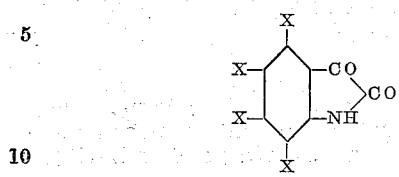

(wherein two X's mean methyl, the third X an alkoxy-group and the fourth X hydrogen or halogen).

Our U. S. application Ser. No. 650,578, filed on the same date, relates to dimethyl-alkoxy-hydroxy-thionaphthenes and to nuclear halogeno-derivatives of these compounds.

The present application is a further embodiment of the said invention and comprises the corresponding isatine-derivatives, i. e. the dimethyl-alkoxy-isatines and nuclear halogeno-derivatives of these compounds.

The new isatines are obtainable from the dimethyl-alkoxy-amino-benzenes or halogeno-dimethyl-alkoxy-amino-benzenes respectively containing a free ortho position to the amino-group e. g. according to the known isatine-synthesis of Sandmeyer (Helv. Chim. A. II, page 237). Moreover the halogeno-dimethyl-alkoxy-isatines may be obtained by after-halogenating the dimethyl-alkoxy-isatines.

These isatines are valuable intermediates for the production of indigoid dyestuffs.

In order to further illustrate our invention the following examples are given; the parts being by weight and all temperatures in centigrade degrees; but it is, however, to be understood that our invention is not limited to the particular products nor reacting conditions mentioned therein.

Example 1

1.3 - dimethyl - 4 - hydroxy - 5 - nitro - benzene (Annalen, vol. 296, page 199) is methylated and reduced. The 1.3-dimethyl-4-methoxy-5-amino-benzene thus formed is warmed with hydroxyl-amine-sulfonic acid and chloral hydrate according to the known isatine-synthesis of Sandmeyer (Hel. Chim. A., II, page 237). Thereby an iso-nitroso-acetanilide of 160° melting point is formed which is converted by shortly warming with concentrated sulfuric acid into the 4.6-dimethyl-7-methoxy-isatine of an orange color melting at 210–212° and corresponding to the following formula:

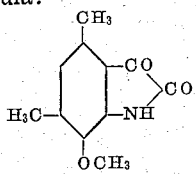

When treating this isatine at 40° in glacial acetic acid with chlorine gas the 5-chloro-4.6-dimethyl-7-methoxy-isatine of 268–270° melting point is obtained; it corresponds to the following formula:

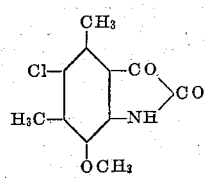

When brominating the same isatine in an analogous manner the 5-bromo-4.6-dimethyl-7-methoxy-isatine of 274–276° melting point is obtained.

By starting, instead of from the methylated, from the ethylated 1.3-dimethyl-4-hydroxy-5-nitrobenzene and working in an analogous manner, the corresponding ethoxy-compound is obtained which is very similar as to its properties to the fore-described methoxy-compound.

Example 2

1.4 - dimethyl - 2 - methoxy-5-amino - benzene (Beilstein XIII, page 34) is acetylated, chlorinated and saponified. The 3-chloro-1.4-dimethyl-2-methoxy-5-amino-benzene thus formed yields according to Sandmeyer's isatine-synthesis the 6-chloro-4.7-dimethyl-5-methoxy-isatine of 238–240° melting point which corresponds to the following formula:

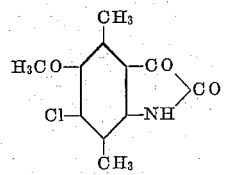

Example 3

1-amino-2.3-dimethyl-4-methoxy - benzene is transformed according to Sandmeyer's reaction into the 5-methoxy-6.7-dimethyl-isatine which melts at 281–183°; the corresponding iso-nitrosoacetanilide melts at 192–194°. This isatine corresponds to the following formula:

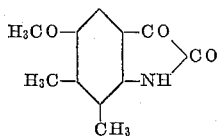

By starting from the 1-amino-2.3-dimethyl-4-methoxy-5-chloro-benzene, in the same manner 4-chloro-5-methoxy-6.7-dimethyl-isatine of 264–268° melting point is obtained; the corresponding iso-nitroso-acetanilide melts at 154–156°.

*Example 4*

1.3 - dimethyl - 5 - amino-2-methoxy - benzene (Zentralblatt 1931, vol. I, page 2750) is converted, in an analogous manner to the chlorination of Example 2, into the 1.3-dimethyl-4-bromo-2-methoxy-benzene and the latter into the 7-bromo-4.6-dimethyl-5-methoxy-isatine of 227–228° melting point which corresponds to the following formula:

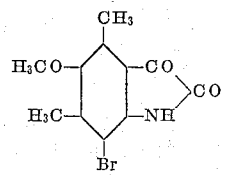

When starting in this example from the corresponding chloro-substituted base, in an analogous manner the 7-chloro-4.6-dimethyl-5-methoxy-isatine of 229° melting point is obtained.

By treating the starting material (1.3-dimethyl-5-amino-2-methoxy-benzene) according to the isatine-synthesis of Sandmeyer without previously halogenating, the 4.6-dimethyl-5-methoxy-isatine of 223–224° melting point is obtained which corresponds to the following formula:

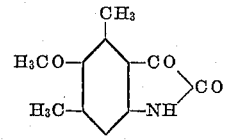

*Example 5*

1 - amino-2.5-dimethyl-3-methoxy - 4 - chloro-benzene, obtained from 1-amino-2.5-dimethyl-3-methoxy-benzene by chlorination of the corresponding urea and subsequent saponification, is transformed according to Martinet (Ann. Chim., vol. IX, page 11, 1919) by condensation with mesoxalic ester into the 4.7-dimethyl-5-chloro-6-methoxy-isatine of 259–261° melting point. This isatine corresponds to the following formula:

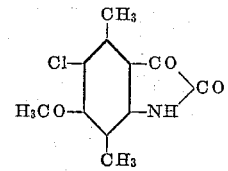

We claim:
1. The isatines of the general formula:

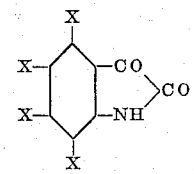

(wherein two X's means methyl, the third X an alkoxy-group and the fourth X hydrogen or halogen), which compounds represent light colored powders having a definite melting point.

2. The isatines of the general formula:

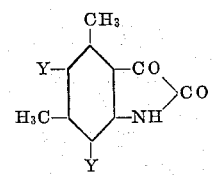

(wherein one Y means an alkoxy-group, the other Y hydrogen or halogen), which compounds represent light colored powders having a definite melting point.

3. The 4.6-dimethyl-5-methoxy-7-chloro-isatine of the formula:

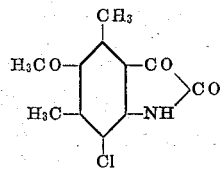

which compound represents a light colored powder melting at 229°.

4. The 4.6-dimethyl-5-bromo-7-methoxy-isatine of the formula:

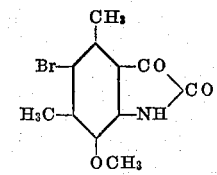

which compound represents a light colored powder melting at 274–276°.

5. The 4.6-dimethyl-5-methoxy-isatine of the formula:

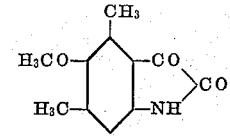

which compound represents a light colored powder melting at 223–224°.

NORBERT STEIGER.
WALTER BRUNNER.